US012115788B2

(12) United States Patent
Murakami et al.

(10) Patent No.: US 12,115,788 B2
(45) Date of Patent: Oct. 15, 2024

(54) FLOW PATH MEMBER AND LIQUID DISCHARGE HEAD

(71) Applicant: CANON KABUSHIKI KAISHA, Tokyo (JP)

(72) Inventors: Ryotaro Murakami, Kanagawa (JP); Manabu Otsuka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 133 days.

(21) Appl. No.: 17/891,049

(22) Filed: Aug. 18, 2022

(65) Prior Publication Data

US 2023/0055886 A1 Feb. 23, 2023

(30) Foreign Application Priority Data

Aug. 23, 2021 (JP) ................................. 2021-135583

(51) Int. Cl.
*B41J 2/14* (2006.01)

(52) U.S. Cl.
CPC ....... *B41J 2/14145* (2013.01); *B41J 2/14201* (2013.01); *B41J 2002/14306* (2013.01)

(58) Field of Classification Search
CPC ................ B41J 2/14145; B41J 2/14201; B41J 2002/14306
See application file for complete search history.

(56) References Cited

U.S. PATENT DOCUMENTS 9,475,278 B2 * 10/2016 Rivas ...................... B32B 37/18

FOREIGN PATENT DOCUMENTS

JP 2001047620 A 2/2001

* cited by examiner

*Primary Examiner* — Geoffrey S Mruk
(74) *Attorney, Agent, or Firm* — Canon U.S.A., Inc. IP Division

(57) ABSTRACT

A flow path member includes a first substrate having a first surface that has a flow path, and includes a second substrate having a second surface opposing the first surface. In the flow path member in which the first and second substrates are joined together with adhesive provided between the first and second surfaces, a groove is formed in at least one of the first and second surfaces. When the first substrate is viewed from a direction orthogonal to the first surface, the flow path is disposed on a groove inner side. The groove has a first portion having a first depth and a second portion having a second depth shallower than the first depth. The second portion is that portion of the groove existing inside a region surrounded by an outer edge of the first surface and extension lines of two sides that form a flow path corner.

8 Claims, 9 Drawing Sheets

FLOW PATH MEMBER AND LIQUID DISCHARGE HEAD

BACKGROUND

Field

The present disclosure relates to a flow path member and a liquid discharge head using the same.

Description of the Related Art

A recording device that performs recording by discharging a liquid onto a record medium, such as paper, has a liquid discharge head that includes, for example, a discharge port that discharges a liquid and an energy generating element that generates energy for discharging the liquid. The liquid discharge head further includes a flow path member having a flow path for supplying a liquid to the discharge port and the energy generating element. The flow path member may include a laminate of a plurality of substrates having a groove or a through hole, which becomes the flow path. When the plurality of substrates are laminated by joining them with an adhesive, a part of the flow path may be blocked by excess adhesive flowing into the flow path. Accordingly, a method of suppressing an adhesive from flowing into the flow path by forming a groove (hereunder referred to as "adhesive clearance groove" or "clearance groove") in joint surfaces between the substrates is known, the groove capable of accommodating excess adhesive.

FIG. 16 shows an example in which a clearance groove is not formed in a substrate. A first substrate 102 and a second substrate 104 are joined to each other through an adhesive 105. Since a clearance groove is not formed, excess adhesive 112 flows into a flow path 110. FIG. 17 shows an example in which a clearance groove 103 is formed in the first substrate 102. Since the clearance groove 103 is formed, excess adhesive is accommodated in the clearance groove 103, and the flow of the adhesive 112 into the flow path 110 is suppressed compared with that of the example in FIG. 17. However, since the substrate becomes thinner at a portion thereof having the clearance groove by an amount corresponding to the depth of the clearance groove, the rigidity of the substrate is reduced. The reduction in the rigidity of the substrate leads to breakage of the substrate.

Accordingly, in Japanese Patent Laid-Open No. 2001-047620, in order to ensure the rigidity of a substrate, a region where a clearance groove is not formed (hereunder referred to as "separation portion") is provided. Since, due to the separation portion, the thickness of the substrate is not reduced at a portion thereof corresponding to the separation portion, it is possible to ensure the rigidity of the substrate.

Since the separation portion is not effective in accommodating excess adhesive, the adhesive may flow into the flow path by passing the separation portion.

SUMMARY

The present disclosure provides a flow path member having a clearance groove capable of ensuring the rigidity of a substrate while suppressing an adhesive from flowing into a flow path; and to a liquid discharge head using the same.

According to an aspect of the present disclosure, a flow path member includes: a first substrate having a first surface that has a flow path, and a second substrate having a second surface opposing the first surface, wherein, in the flow path member in which the first substrate and the second substrate are joined to each other with an adhesive provided between the first surface and the second surface, a groove is formed in at least one of the first surface and the second surface, wherein, when the first substrate is viewed from a direction orthogonal to the first surface, the flow path is disposed on an inner side of the groove, wherein the groove has a first portion having a first depth and a second portion having a second depth that is shallower than the first depth, and wherein the second portion is that portion of the groove existing inside a region surrounded by an outer edge of the first surface and extension lines of two sides that form a corner of the flow path.

Further features of the present disclosure will become apparent from the following description of exemplary embodiments with reference to the attached drawings.

DESCRIPTION OF THE EMBODIMENTS

Embodiments of the present disclosure are described in detail below.

Liquid Discharge Head

Figure 1A:
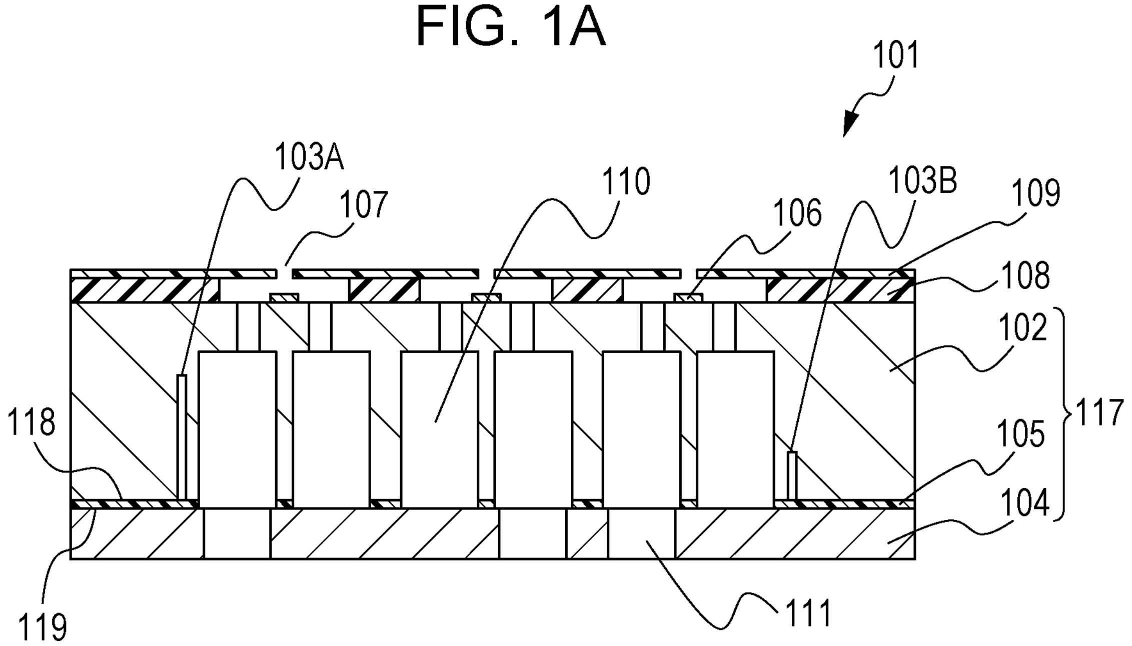
FIGS. 1A and 1B are, respectively, a sectional schematic view of a liquid discharge head and a top view of a first substrate.
Figure 1B:
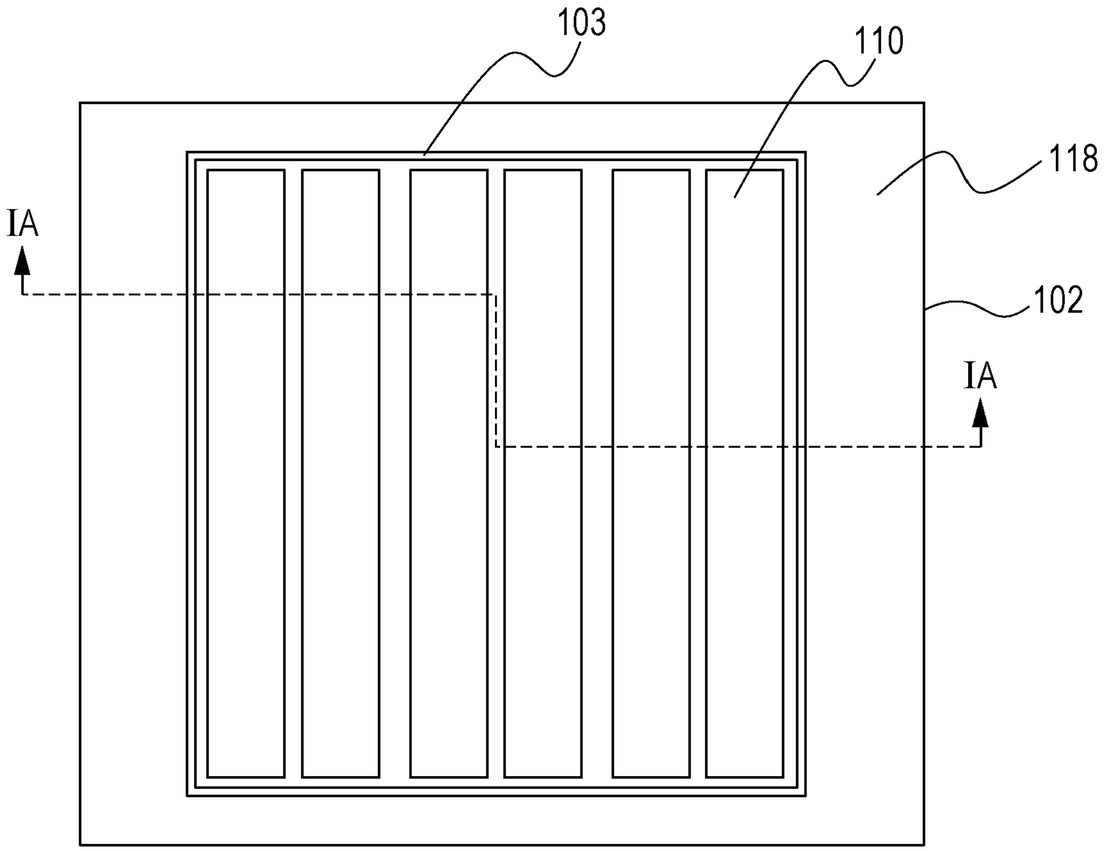

FIG. 1A is a schematic sectional view of a liquid discharge head 101 (a sectional view corresponding to a section along line IA-IA in FIG. 1B). FIG. 1B is a top view of a first substrate 102, that is, a top view of the first substrate 102 when seen from a direction orthogonal to a first surface 118. A flow path member 117 of the liquid discharge head 101 is formed by joining the first substrate 102 and a second substrate 104 to each other with an adhesive 105. Energy generating elements 106 that generate energy for discharging a liquid are formed on a surface of the first substrate 102 on a side of a discharge port 107. Examples of energy generating elements include heating resistors and piezoelectric elements.

A flow path layer 108 and a discharge port layer 109 are formed on the first substrate 102, and a liquid passes through holes 110 formed in the first substrate 102 and through holes 111 formed in the second substrate 104, and is supplied to the liquid flow layer 108. Then, energy generated by the energy generating elements 106 is applied to eject the liquid from the discharge port 107.

Silicon is suitable as the material of the first substrate 102 and the material of the second substrate 104. Silicon carbide, silicon nitride, various glass (quartz glass, borosilicate glass, non-alkali glass, soda glass), various ceramics (alumina, gallium arsenide, gallium nitride, aluminum nitride), or resin can be used as the material of the first substrate 102 and the material of the second substrate 104.

The through holes 110 and the through holes 111 that supply a liquid to the flow path layer 108 are formed in a corresponding one of the first substrate 102 and the second substrate 104. Examples of methods of forming the through holes include dry etching and wet etching. In order to adjust the height of a flow path in a section direction, a member can be made thin by back-grinding or chemical mechanical polishing (CMP) or by dry etching using a reactive gas. A member can also be made thin by wet etching using a medical fluid, such as nitrohydrofluoric acid. Examples of perforation methods include a method of processing from both surfaces of a substrate to perforate the inside of the substrate, a method of processing from one surface of a substrate to perforate an opposite surface of the substrate, and a method of forming a non-through hole from one surface of a substrate and making thin the substrate by back-grinding or CMP mentioned above, to perforate an opposite surface of the substrate.

As the adhesive 105, a material having high adhesiveness with respect to the substrates is suitably used. It is desirable to use a material whose quantity of entering air bubbles or the like is small and having high coatability, or a material allowing the thickness of the adhesive 105 to be easily reduced and having low viscosity. It is desirable that the adhesive 105 include any one of resins selected from the group consisting of epoxy resin, acrylic resin, silicone resin, benzocyclobutene resin, polyamide resin, polyimide resin, and urethane resin. Examples of methods of curing the adhesive 105 include a thermosetting method and an ultraviolet-ray delayed curing method. Note that, when either one of the substrates has transmittance with respect to ultraviolet rays, an ultraviolet-ray curing method can also be used.

An example of a method of applying the adhesive 105 includes an adhesive transfer method using a substrate. Specifically, a transfer base material is prepared, and the transfer base material is uniformly coated with a thin layer of adhesive by spin coating or slit coating. Then, by bringing a bonding surface of the first substrate 102 into contact with the adhesive with which the transfer base material has been coated, the adhesive can be transferred to only the bonding surface of the first substrate 102. It is desirable that the size of the transfer base material be greater than or equal to the size of the first substrate 102. As the base material, silicon, glass, or a film, such as a PET film, a PEN film, or a PI film, is suitably used. Examples of methods of directly forming an adhesive on the first substrate 102 include screen printing and dispense coating.

The first substrate 102 and the second substrate 104 are joined to each other by pressing them with a predetermined pressure for a predetermined period of time after heating the substrates to a predetermined temperature inside a joining device. Parameters for joining these substrates are suitably set in accordance with an adhesive material. It is desirable to join the substrates to each other in a vacuum because air bubbles are suppressed from entering a joint.

When the adhesive 105 is of a thermosetting type, the adhesive 105 may be heated until the adhesive 105 is cured inside the joining device. The curing may be accelerated by, after joining the substrates, taking out a base-plate joined body and, separately, heating the base-plate joined body in, for example, an oven. When the adhesive 105 is of an ultraviolet-ray delayed type, after previously irradiating the adhesive 105 with a prescribed quantity of ultraviolet rays before joining the substrates, the substrates are joined to each other. It is desirable to, after joining the substrates, further heat the base-plate joined body to sufficiently accelerate the curing. When the adhesive 105 is of an ultraviolet curing type, after joining the substrates to each other, the adhesive 105 is irradiated with a prescribed quantity of ultraviolet rays over the substrate having transmittance with respect to the ultraviolet rays, and is cured.

It is desirable to, after joining the substrates to each other, sufficiently accelerate the curing by further heating the base-plate joined body.

The flow path layer 108 and the discharge port layer 109 can include, for example, epoxy resin, acrylic resin, or urethane resin. Examples of epoxy resin include bisphenol A epoxy resin, cresol novolac epoxy resin, and alicyclic epoxy resin. An example of acrylic resin is polymethyl methacrylate. An example of urethane resin is polyurethane.

In the formation method, a dry film resist in which a film base material is coated with a photo-setting resin is adhered to the first substrate 102. Thereafter, by exposing/developing the dry film resist, the flow path layer 108 is subjected to patterning. Next, the discharge port layer 109 is similarly subjected to patterning by using a dry film resist. Lastly, unexposed portions are simultaneously developed to form the flow path layer 108 and the discharge port layer 109. When using the dry film resist in the formation method, in order to increase the rigidity of the dry film resist, it is desirable to add a resin binder to a resin layer. “Resin binder” refers to resin having a molecular weight that is higher than that of a base resin (for example, the epoxy resin above), which is added for the purpose of, by increasing the weight average molecular weight of the resin layer, increasing the cohesion power and the softening point of the film. By increasing the rigidity of the resin layer, when a substrate has a through opening (liquid supply opening), the resin layer can be easily transferred onto the through opening.

The flow path layer 108 and the discharge port layer 109 can be formed before forming the through holes in the first substrate 102, in which case, the flow path layer 108 and the discharge port layer 109 can be formed by directly forming the resin layer on the first substrate 102 by spin-coating.

Further, the timing of forming the flow path layer 108 and the discharge port layer 109 may be either before or after joining the first substrate 102 and the second substrate 104 to each other.

First Embodiment

In the present embodiment, as shown in FIGS. 1A and 1B, a groove (clearance groove) 103 that suppresses an adhesive from protruding into a flow path is formed in a first surface 118 of a first substrate 102. Note that a clearance groove 103 may be formed in a second surface 119 of a second substrate 104. Of surfaces of the second substrate 104, the second surface 119 is a surface opposing the first surface 118. Further, clearance grooves 103 may be formed in both of the first surface 118 and the second surface 119. Therefore, a clearance groove 103 may be formed in at least one of the first surface 118 and the second surface 119. As shown in FIG. 1B, a plurality of flow paths 110 are formed in the first surface 118. The clearance groove 103 is continuously formed in the form of a ring so as to surround the flow paths 110. In other words, when the first substrate 102 is seen from a direction orthogonal to the first surface 118, the flow paths are disposed on an inner side of the groove 103 having the ring shape. The shape of each flow path 110 is a rectangular shape. The clearance groove has portions having different depths therein. That is, the clearance groove 103 has a first portion 103A having a first depth and a second portion 103B having a second depth that is shallower than the first depth. The first portion 103A where the clearance groove is deep is capable of receiving a large amount of adhesive, and the second portion 103B where the clearance groove is shallow is capable of suppressing a reduction in the rigidity of the substrate. The depth of the clearance groove refers to the depth from the first surface 118 when the clearance groove 103 is formed in the first surface 118, and refers to the depth from the second surface 119 when the clearance groove 103 is formed in the second surface 119.

Further, since the second portion 103B, which is a shallow clearance groove portion, and the first portion 103A, which is a deep clearance groove portion, continuously communicate with each other, when an adhesive that cannot be completely accommodated by the second portion 103B, which is a shallow clearance groove portion, has flowed in, the adhesive flows into the first portion 103A from the second portion 103B. Therefore, even if the shallow second portion 103B exists, the excess adhesive receiving capability of the clearance groove as a whole is not reduced.

Compared with a clearance groove in which all portions have the same depth, the clearance groove according to the present disclosure can ensure the strength of the substrate. This is because a boundary between the first portion 103A and the second portion 103B has the shape of a step, and the strength with respect to external stress is increased.

Figure 2:
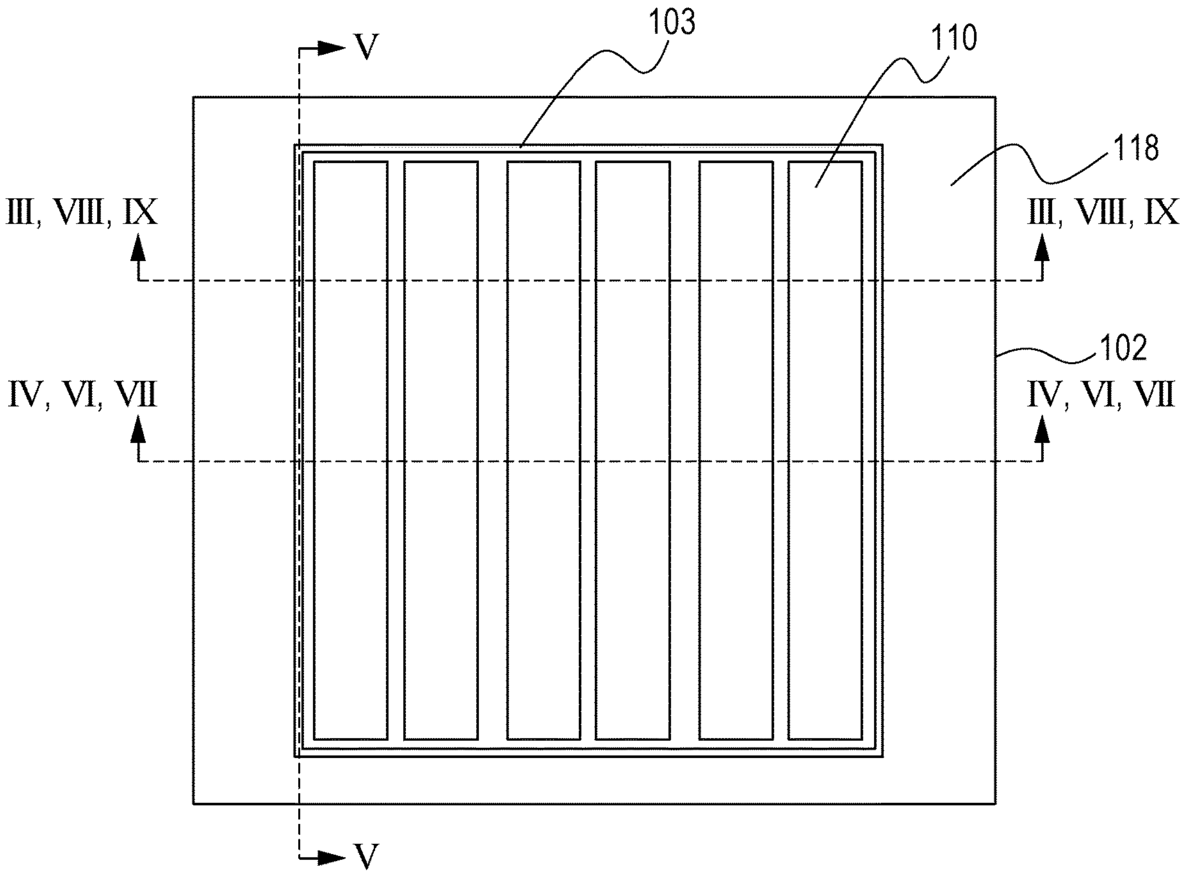
FIG. 2 is a top view of the first substrate.

FIG. 2 is a top view of the first substrate 102. The flow paths 110 of the first substrate are disposed with narrow pitches, and it is desirable that the clearance groove 103 be disposed along an outer edge of a flow path group when an adhesive between the flow paths is allowed to protrude.

Figure 3:
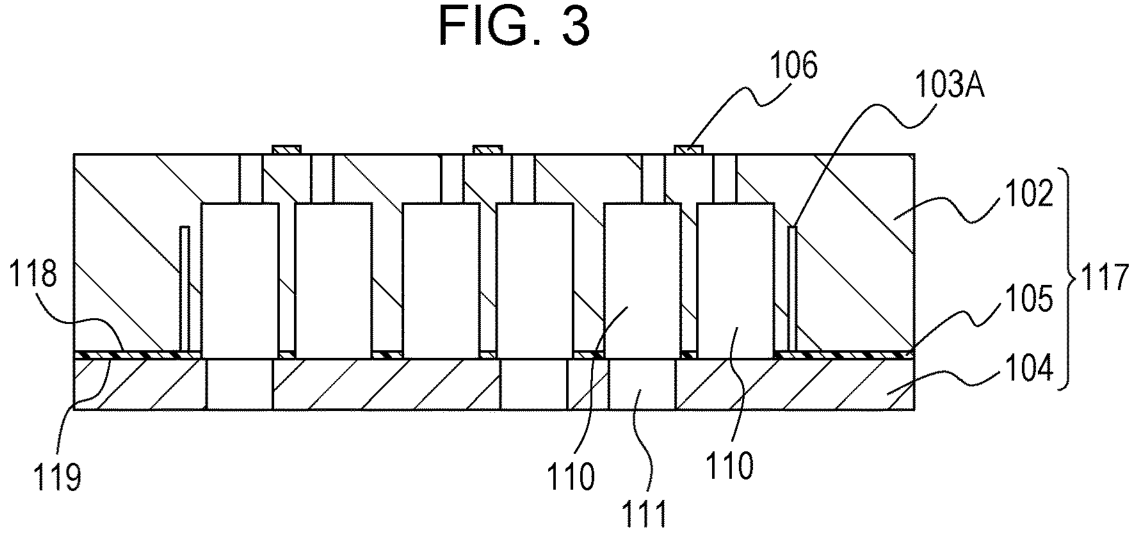
FIG. 3 is a sectional view along line in FIG. 2.
Figure 4:
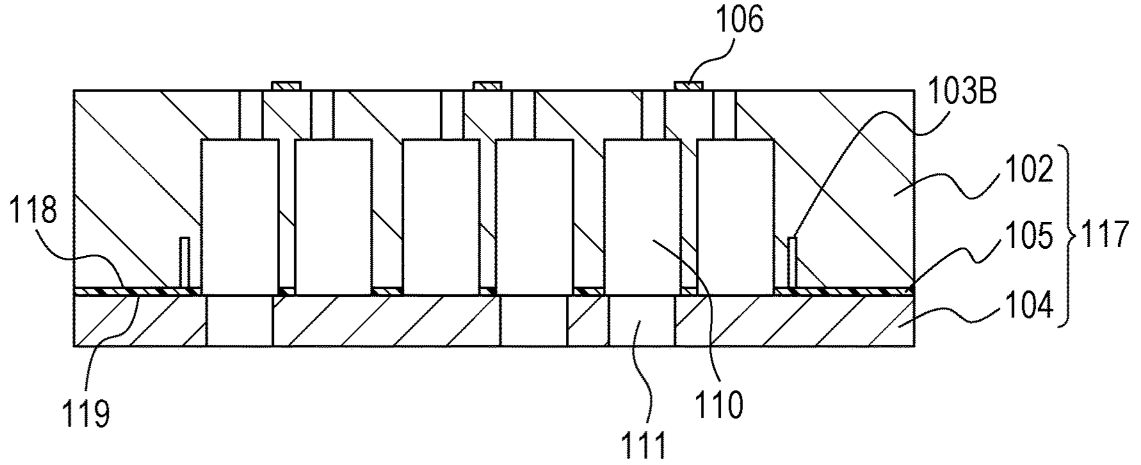
FIG. 4 is a sectional view along line IV-IV in FIG. 2.
Figure 5:
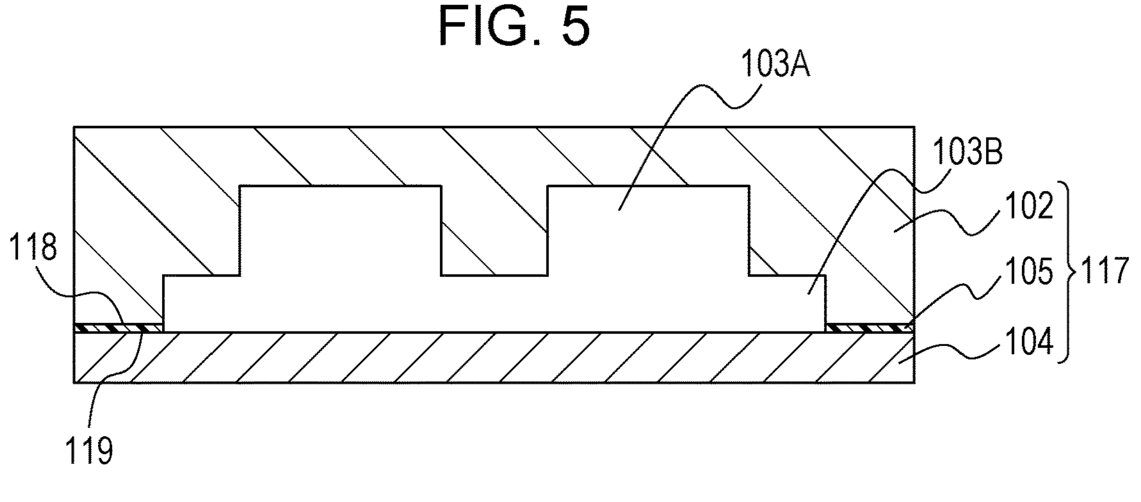
FIG. 5 is a sectional view along line V-V in FIG. 2.

FIG. 3 is a sectional view along line in FIG. 2. FIG. 4 is a sectional view along line IV-IV in FIG. 2. FIG. 5 is a sectional view along line V-V in FIG. 2.

Figure 6:
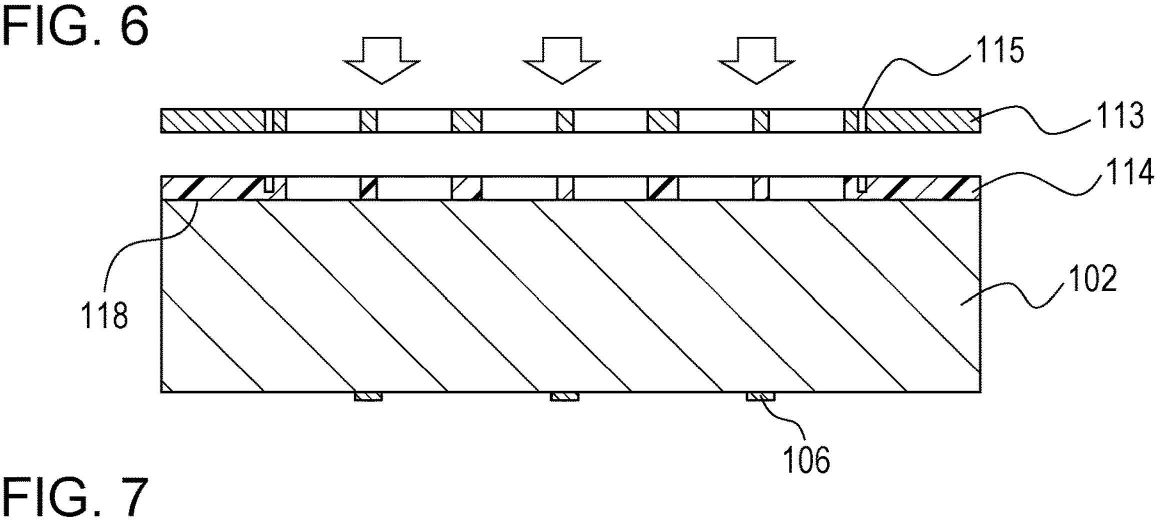
FIG. 6 shows a formation step in a section along line VI-VI in FIG. 2.
Figure 7:
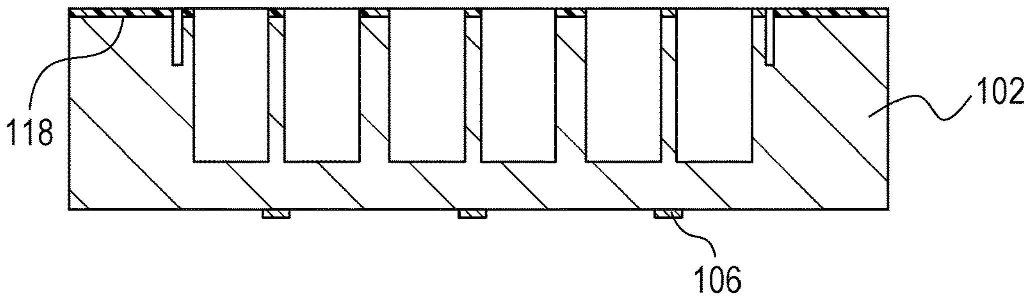
FIG. 7 shows a formation step in a section along line VII-VII in FIG. 2.
Figure 8:
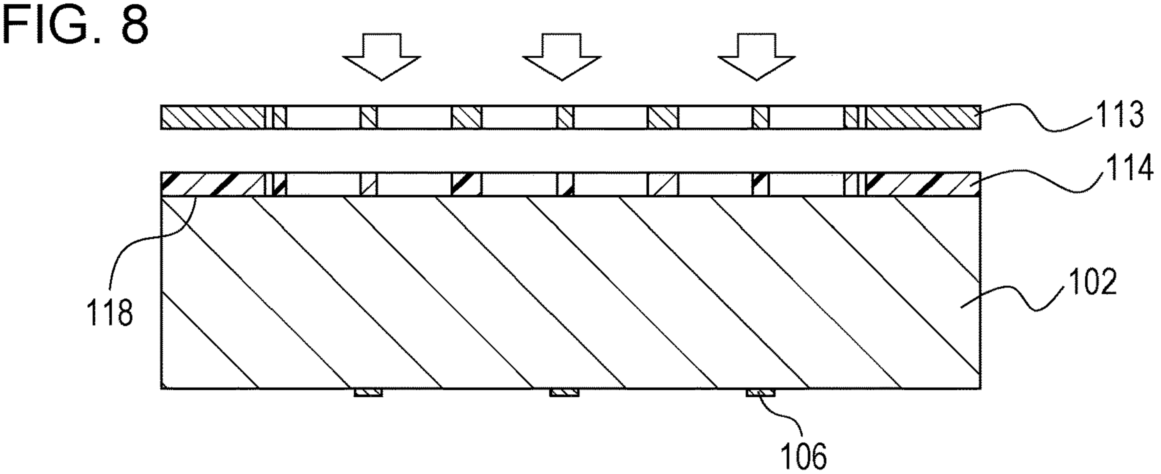
FIG. 8 shows a formation step in a section along line VIII-VIII in FIG. 2.
Figure 9:
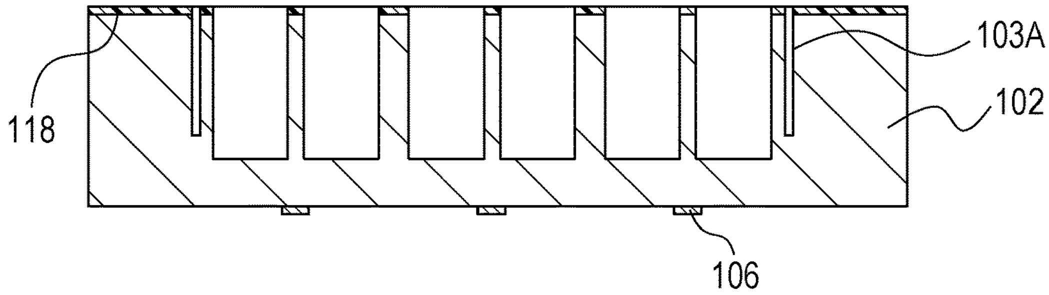
FIG. 9 shows a formation step in a section along line IX-IX in FIG. 2.

Formation steps in a section along line VIII-VIII in FIG. 2 and in a section along line IX-IX in FIG. 2 are shown in FIGS. 8 and 9, and formation steps in a section along line VI-VI in FIG. 2 and in a section along line VII-VII in FIG. 2 are shown in FIGS. 6 and 7. As a method of forming the clearance groove 103, as shown in FIG. 6, in a step of forming a mask resist 114 that is formed on the first substrate 102, an exposure mask 113 having a halftone portion 115 is used. The halftone portion 115 is used at a position corresponding to an opening portion of the clearance groove 103.

A semitransmissive film is provided at the halftone portion, the halftone portion is brought into a half-exposed state, and a resist film remains. In addition to a halftone mask, there exists a gray-tone mask, and the gray-tone mask produces a half-exposed state by a slit providing a resolution less than or equal to an exposure resolution.

After subjecting the mask resist to patterning, the flow paths are formed by dry etching. When, by dry etching, the film thickness of the remaining portion of the resist film is reduced and a surface of the substrate is exposed, etching of the substrate is started.

That is, a groove can be shallower in a portion exposed at the halftone portion than in other portions that are normally exposed.

Examples of adjusting the depth of the clearance groove include adjusting the initial film thickness of the mask resist and adjusting the transmittance of the semitransmissive film of the halftone mask.

The clearance groove 103 formed as described above has portions having different depths in one continuous clearance groove. The shallow clearance groove portion 103B is a portion of the substrate where a large amount of the substrate remains in a section direction of the substrate, and can have a higher rigidity than that of a clearance groove in which all portions thereof are deep.

From the viewpoint of ensuring the rigidity of the substrate, it is desirable that, when a depth of the first portion 103A is H1 and a depth of the second portion 103B is H2, the depth of the clearance groove be set so that a ratio H2/H1 is ½ or less. In other words, a second depth, which is the depth of the second portion 103B, is less than or equal to half of a first depth, which is the depth of the first portion 103A. Although the ability of the shallow clearance groove portion to receive excess adhesive is reduced, since the deep clearance groove portion is continuously formed, the adhesive that could no longer be received by the shallow clearance groove portion flows into a deep portion, as a result of which the ability of the clearance groove as a whole is not reduced. Further, in the present embodiment, as shown in FIG. 5, the clearance groove is formed so that a bottom portion of the clearance groove is parallel to joint surfaces (the first surface and the second surface). By forming the bottom portion parallel to the joint surfaces, the volume of the clearance groove can be maximized.

Second Embodiment

A second embodiment is described with reference to FIGS. 10 to 13. In the second embodiment, the depth of a clearance groove 103 is changed by changing the width of the clearance groove 103. When the clearance groove is formed by dry etching, an etching rate when processing in accordance with an opening width of a mask resist is changed. The etching rate is lower when the opening width is narrow than when the opening width is wide. This is called a micro loading effect.

Figure 10:
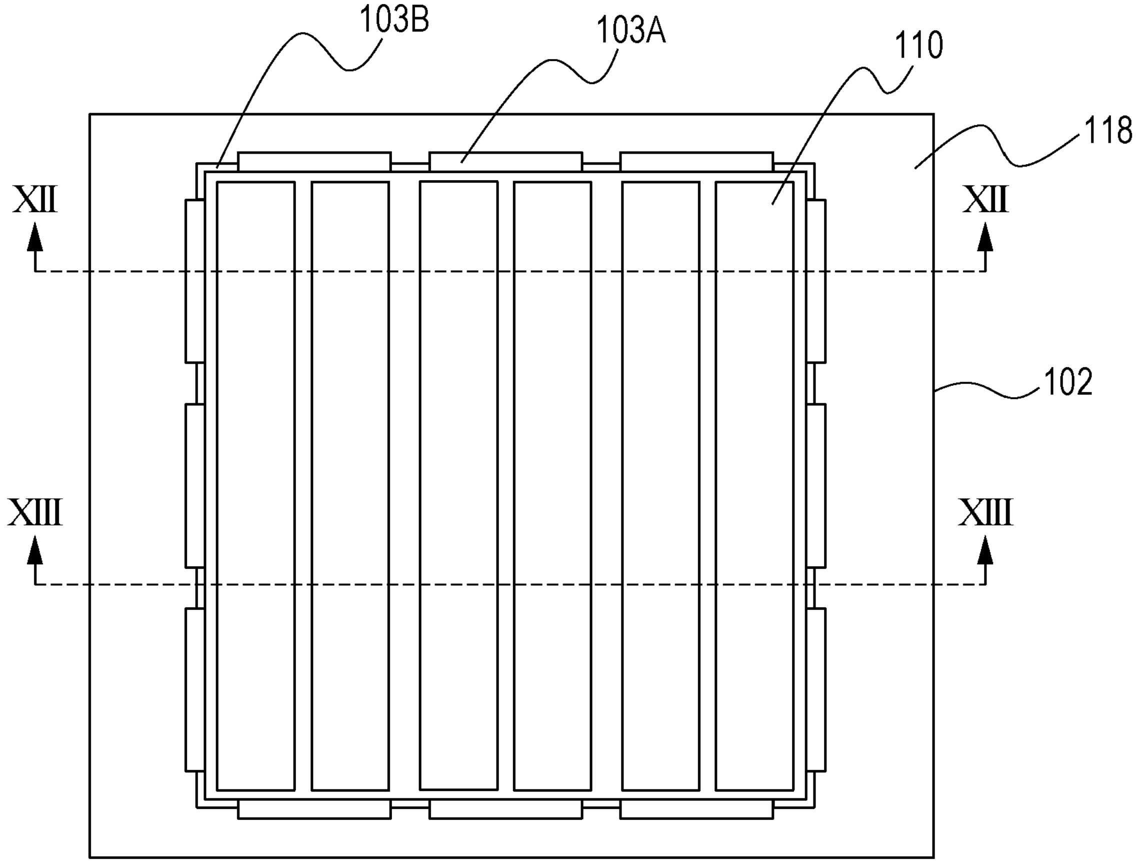
FIG. 10 shows a clearance groove according to a second embodiment.
Figure 11:
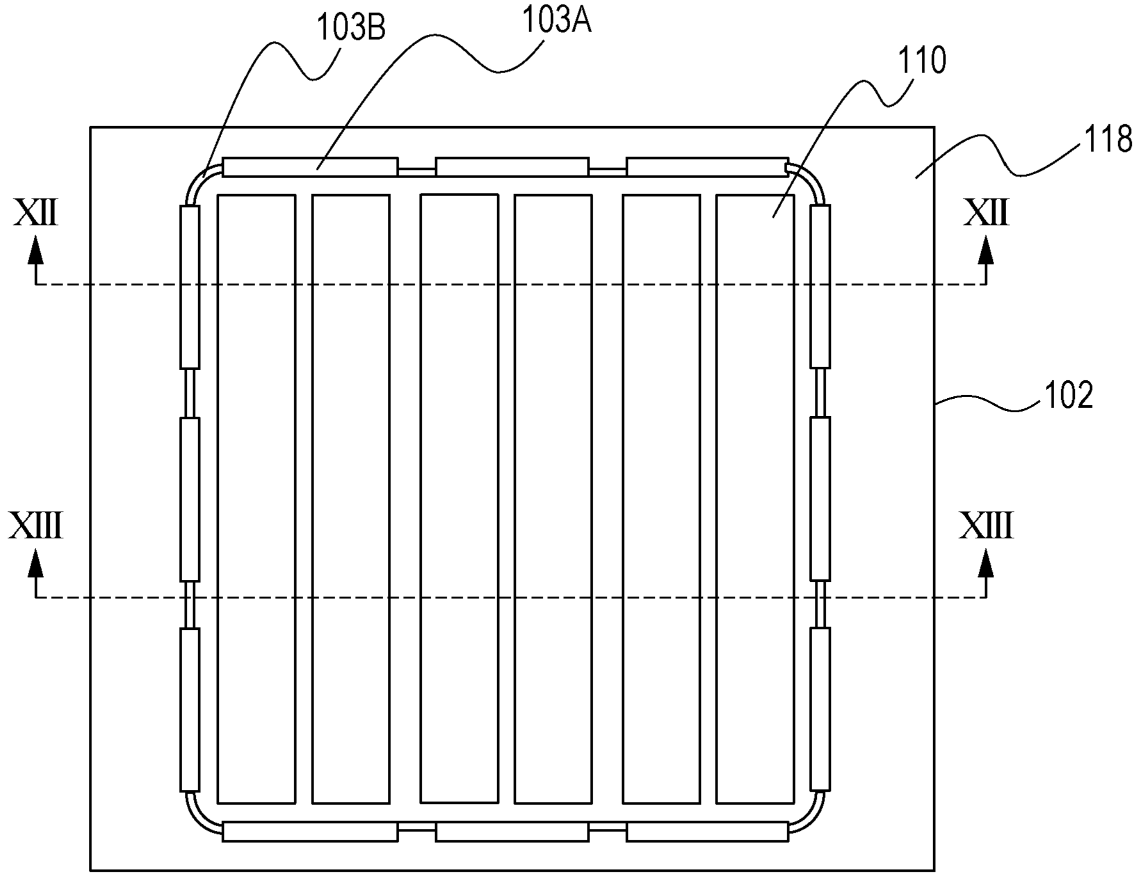
FIG. 11 shows a clearance groove according to the second embodiment.
Figure 12:
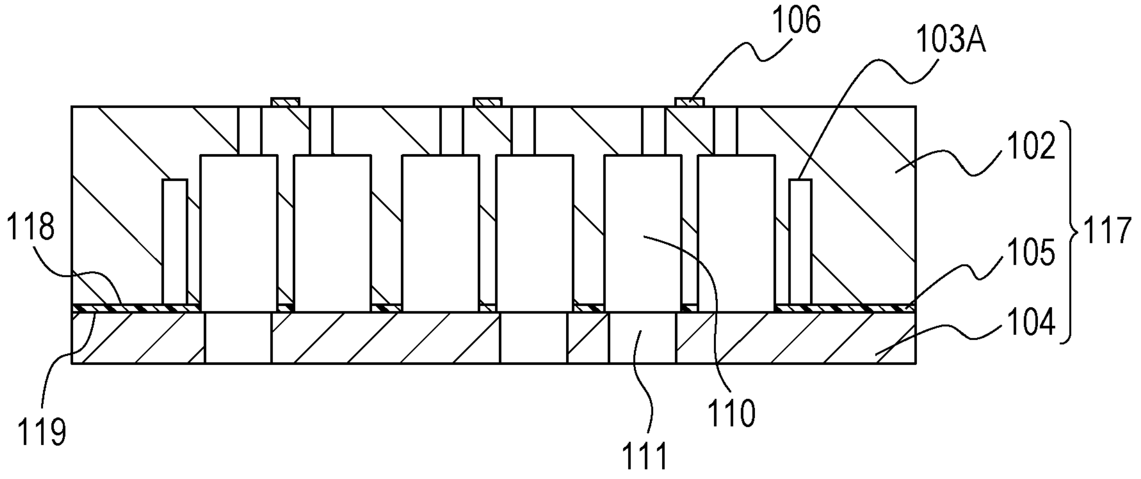
FIG. 12 is a sectional view along line XII-XII in FIG. 10.
Figure 13:
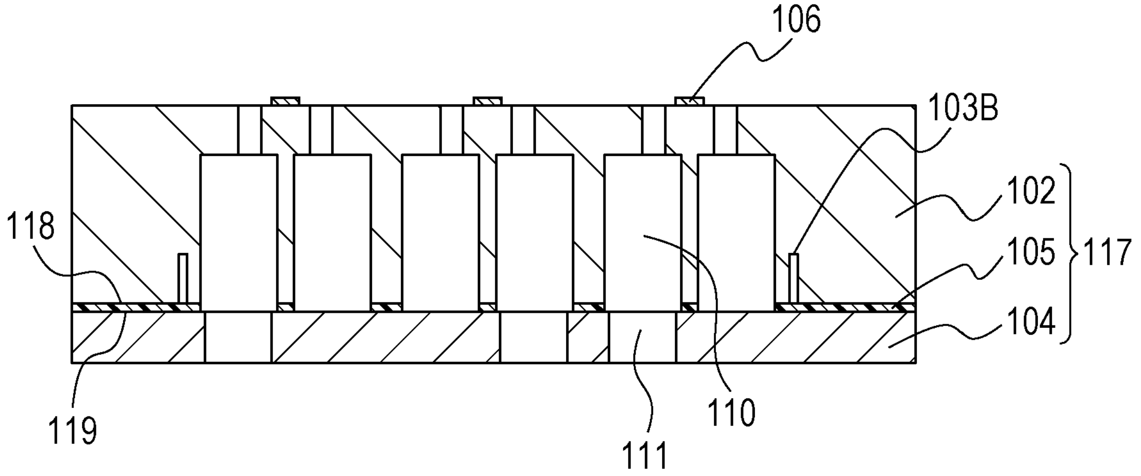
FIG. 13 is a sectional view along line XIII-XIII in FIG. 10.

When a portion 103B where the width of a clearance groove portion is narrow and a portion 103A where the width of a clearance groove portion is wide are provided as shown in FIG. 10, the depth of the clearance groove is shallower at the portion having a narrow width than at the portion having a wide width as in a section along line XII-XII shown in FIG. 12 and in a section along line XIII-XIII shown in FIG. 13. When a force is applied to a substrate, corners of flow paths 110 in FIG. 10 tend to break because stress tends to concentrate thereat. Therefore, at the corners of the flow paths where walls thereof intersect each other, the clearance groove that exists in a region surrounded by extension lines of the respective walls is shallowly formed. In other words, a portion of the clearance groove existing inside a region surrounded by the extension lines of two sides of corresponding flow paths 110 and outer edges of a first surface is a second portion having a shallow depth, the two sides forming the corners of the corresponding flow paths 110. Therefore, the rigidity of the substrate in a section direction is ensured, and, even when the substrate is subjected to a force, the substrate does not easily break. Further, in order to prevent the stress from concentrating on the corners of the clearance groove, the corners may be curved as shown in FIG. 11.

Third Embodiment

Figure 14:
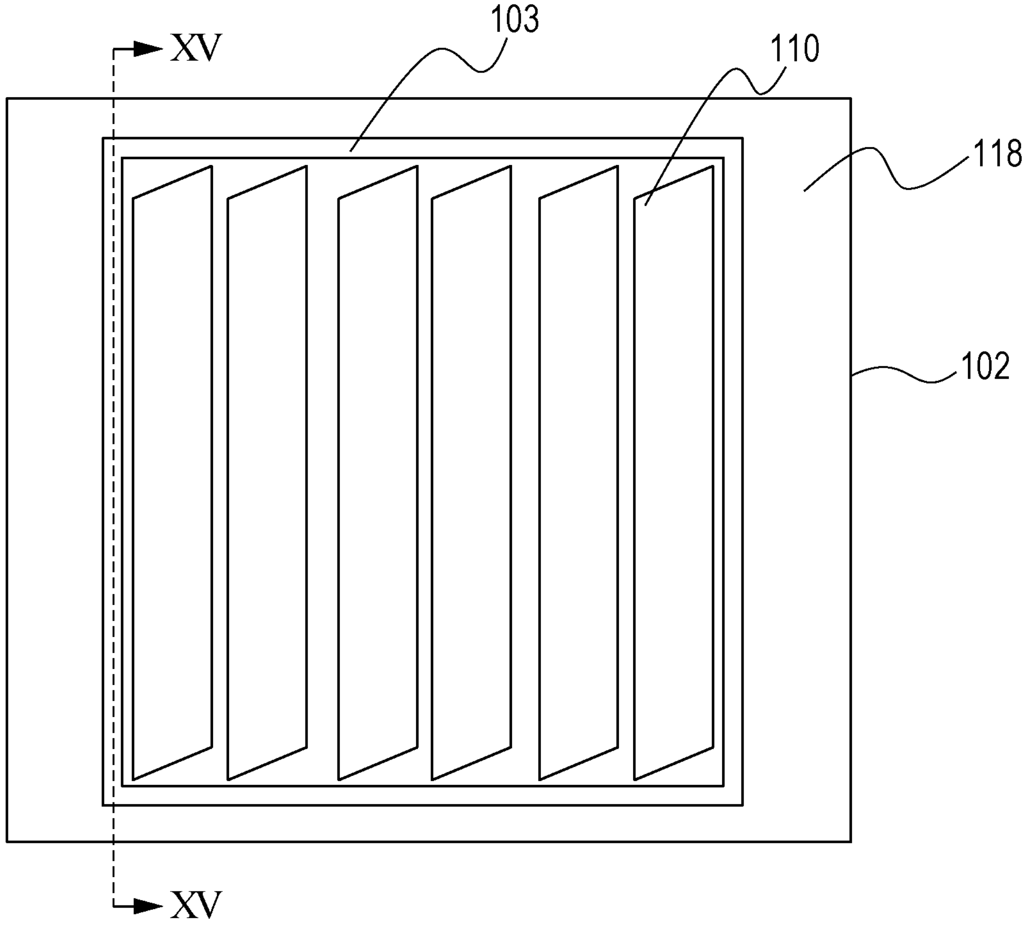
FIG. 14 shows a clearance groove according to a third embodiment.
Figure 15:
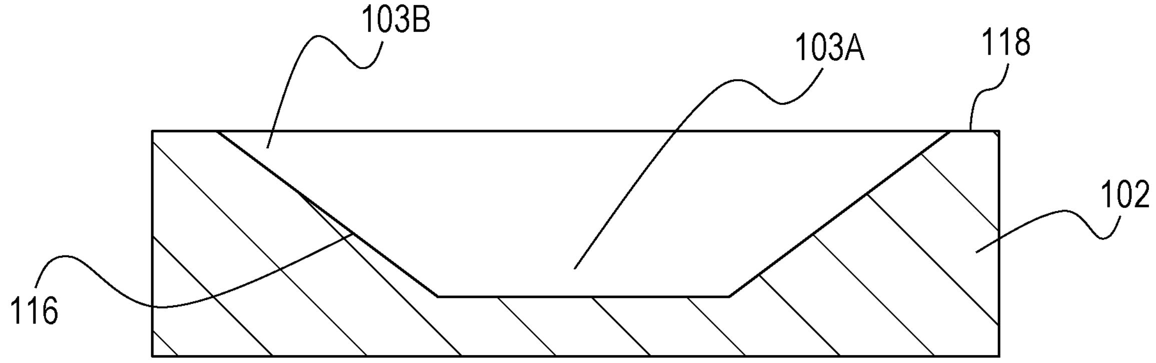
FIG. 15 is a sectional view along line XV-XV in FIG. 14.
Figure 16:
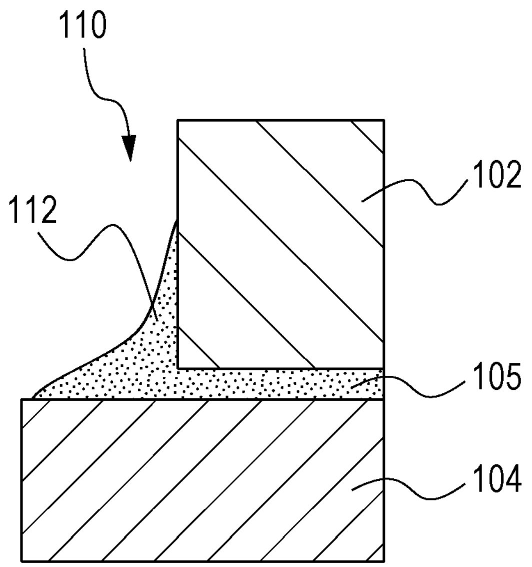
FIG. 16 shows an example in which a clearance groove is not formed in a substrate.
Figure 17:
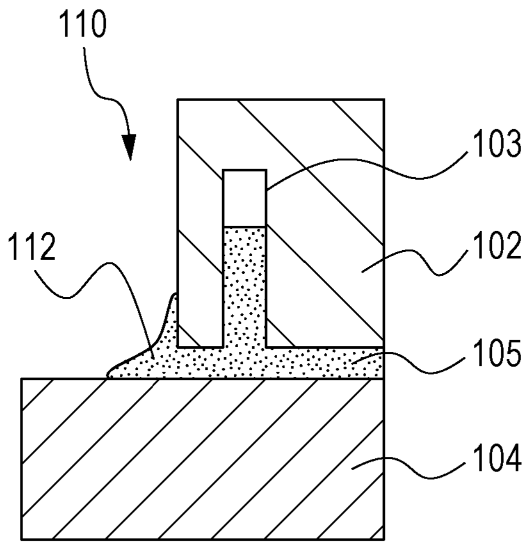
FIG. 17 shows the effects when a clearance groove is formed in the substrate.

A third embodiment is described with reference to FIGS. 14 and 15. In the third embodiment, a substrate 101 is a silicon substrate having a crystal orientation (110). Flow paths are formed in the substrate 101 by wet etching using a strong alkaline solution, such as TMAH or KOH. FIG. 15 is a sectional view along line XV-XV in FIG. 14. When the (110) substrate is used, since a slope formed by a (111) surface is formed at a side surface of a clearance groove, a shallow portion and a deep portion are formed. That is, a bottom portion of a first portion 103A is parallel to a first surface 118, whereas a bottom portion of a second portion 103B is a slope inclined with respect to the first surface 118. In this way, by continuously forming portions having different depths by the slope, excess adhesive that has entered the shallow portion easily flows into a deep clearance groove portion.

EXAMPLES

Example 1

A first substrate 102 having formed thereon energy generating elements 106 like those shown in FIG. 1, an electrical circuit (not shown), and an electrical connection part (not shown) was prepared, the energy generating elements 106 being used for discharging a liquid droplet and being made of TaSiN, the electrical circuit driving the energy generating elements 106, and the electrical connection part being electrically connected to an electrical connection substrate. The substrate was made of silicon, and was processed until the substrate was formed into a thin substrate having a substrate thickness of 625 μm by a grinding device.

Flow paths 110 and a clearance groove 103 were formed in the first substrate 102. As shown in FIG. 6, using a positive resist, a mask resist 114 was formed on the first substrate 102 by spin coating. The film thickness was 8 μm. Next, the mask resist 114 was subjected to patterning by using a photolithography technology. An exposure mask 113 used here having a halftone portion 115 provided at a part of a portion of the exposure mask 113 corresponding to a clearance groove portion was used. The halftone portion 115 has a semitransmissive film provided thereat so that the transmittance is 40% of that of a transmissive portion. After exposure, development was performed with a developer including TMAH, and a desired opening pattern was formed. The film thickness of the mask resist at a portion thereof exposed at the halftone portion after the development was 3.2 μm.

Next, the flow paths 110 were formed in the first substrate 102 by using a bosch process. The flow paths 110 and the clearance groove 103 were processed at the same time so that the depth of the flow paths 110 became 450 μm. Here, the etching rate with respect to silicon was 7 μm/min, and the processing time was 65 minutes. Since the etching rate of the mask resist is 0.08 μm/min, the mask resist 114 disappears after 40 minutes from the start of the etching, and the etching for a shallow clearance groove portion 103B is started. As a result, the depth of each flow path 110 was 450 μm, and a deep clearance groove portion 103A was formed with a depth of 400 μm and the shallow clearance groove portion 103B was formed with a depth of 150 μm. After peeling/cleaning the mask resist 114, by using the same process, flow paths were formed from an energy generating element formation surface and were made to penetrate through flow paths formed from a clearance groove formation surface.

For a second substrate 104, a 300-μm silicon substrate was prepared; and a protective tape was adhered to a surface opposite to an etching surface, and etching was performed until the substrate was perforated from one surface to form flow paths.

Next, an adhesive transfer base material was prepared, and was spin-coated with a benzocyclobutene solution, serving as an adhesive, up to a thickness of 3 μm. A PET film was used as the transfer base material. After the coating, in order to volatilize the solvent, a baking process was performed for five minutes at a temperature of 100° C. The adhesive formed on the transfer base material was brought into contact with a joint surface (clearance groove formation surface) of the first substrate 102 while heating the adhesive, to thereby transfer the adhesive to the first substrate 102.

Next, by using a joining alignment device, the first substrate 102 and the second substrate 104 were joined to each other by heating them in a vacuum while aligning them. The first substrate 102 and the second substrate 104 were joined to each other at a degree of vacuum of 100 Pa or less and at a temperature of 150° C. After cooling after completing the joining, the joined substrates were taken out from the device, and were heated for one hour at a temperature of 250° C. in an oven in a nitrogen atmosphere; and the adhesive was cured.

Then, a dry film formed by spin-coating the PET film with a substance in which a negative photosensitive resin was dissolved in a PGMEA solvent, and by drying at a temperature of 100° C. in an oven was transferred to the energy generating element formation surface of the first substrate 102 to peel the PET film. After forming the dry film, the flow paths were brought into a latent-image state by performing exposure/PEB. Then, similarly, dry films were laminated, nozzles were formed by exposure/PEB, and the flow paths and the nozzles were simultaneously developed, to thereby complete a liquid discharge head.

Example 2

In Example 2, the width of a clearance groove is changed and a groove is formed by dry etching, to change the depth.

Specifically, as shown in FIG. 10, the width of a deep clearance groove portion 103A is 100 μm, and the width of the shallow clearance groove portion 103B is 10 μm. Therefore, when etching was performed by using a bosch process to form flow paths 110 to a depth of 450 μm, the deep clearance groove portion 103A could be formed with a depth of 430 μm and the shallow clearance groove portion 103B could be formed with a depth of 80 μm.

Example 3

In Example 3, a silicon substrate having a (110) plane orientation is used for a first substrate, and a clearance groove 103 is formed by wet etching with an alkali etchant, to thereby change the depth in the clearance groove by a (111) surface that is formed in the clearance groove.

By using TMAH as the alkali etchant, the etching was performed by heating to a temperature of 80° C. A section along line XV-XV of the clearance groove 103 is shown in FIG. 15. An inclination was provided inside the clearance groove by the (111) surface 116, and the shallow clearance groove portion 103B and the deep clearance groove portion 103A could be continuously formed.

According to the present disclosure, it is possible to ensure the rigidity of a substrate while suppressing an adhesive from flowing into a flow path.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-135583, filed Aug. 23, 2021, which is hereby incorporated by reference herein in its entirety.

What is claimed is:

1. A flow path member comprising:

a first substrate having a first surface that has a flow path; and a second substrate having a second surface opposing the first surface, wherein, in the flow path member in which the first substrate and the second substrate are joined to each other with an adhesive provided between the first surface and the second surface, a groove is formed in at least one of the first surface or the second surface, wherein, when the flow path member is viewed from a direction orthogonal to the first surface, the groove has a first side extending in a longitudinal direction of the flow path and a second side extending in a direction intersecting the longitudinal direction and intersecting the first side at an intersection part, wherein the groove has a first portion having a first depth and a second portion having a second depth that is shallower than the first depth, and wherein the second portion is provided at least at the intersection part.

2. The flow path member according to claim 1, wherein the second depth is less than or equal to half of the first depth.

3. The flow path member according to claim 1, wherein a bottom portion of the first portion and a bottom portion of the second portion are parallel to the first surface or the second surface.

4. The flow path member according to claim 1, wherein a bottom portion of the first portion is parallel to the first surface or the second surface, and wherein a bottom portion of the second portion has a slope that is inclined with respect to the first surface or the second surface.

5. The flow path member according to claim 1, wherein the flow path is a plurality of flow paths formed in the first surface, and wherein, when the first substrate is viewed from the direction orthogonal to the first surface, the plurality of flow paths is disposed on an inner side of the groove.

6. The flow path member according to claim 1, wherein a width of the second portion is smaller than a width of the first portion.

7. The flow path member according to claim 1, wherein, when the flow path member is viewed from the direction orthogonal to the first surface, the flow path is continuously surrounded by the groove.

8. A liquid discharge head comprising:

a discharge port configured to discharge liquid;

an energy generating element configured to generate energy for discharging the liquid from the discharge port; and a flow path member that includes:

a first substrate having a first surface that has a flow path, and a second substrate having a second surface opposing the first surface, wherein, in the flow path member in which the first substrate and the second substrate are joined to each other with an adhesive provided between the first surface and the second surface, a groove is formed in at least one of the first surface or the second surface, wherein, when the flow path member is viewed from a direction orthogonal to the first surface, the groove has a first side extending in a longitudinal direction of the flow path and a second side extending in a short direction of the flow path and an intersection part where the first side and the second side intersect, wherein the groove has a first portion having a first depth and a second portion having a second depth that is shallower than the first depth, wherein the intersection part of the groove is the second portion, and wherein the flow path member is a member for supplying liquid to the discharge port.

* * * * *